(12) United States Patent
Bardman et al.

(10) Patent No.: US 9,102,775 B2
(45) Date of Patent: Aug. 11, 2015

(54) CORE-SHELL POLYMERS SUITABLE FOR USE IN ORGANIC MEDIA

(75) Inventors: James Keith Bardman, Green Lane, PA (US); Karl Allen Bromm, Forest Grove, PA (US); David Michael Fasano, Maple Glenn, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1928 days.

(21) Appl. No.: 12/313,714

(22) Filed: Nov. 24, 2008

(65) Prior Publication Data

US 2009/0162558 A1   Jun. 25, 2009

Related U.S. Application Data

(60) Provisional application No. 61/008,397, filed on Dec. 20, 2007.

(51) Int. Cl.
| | |
|---|---|
| *C08F 2/14* | (2006.01) |
| *C08F 2/32* | (2006.01) |
| *C08F 265/00* | (2006.01) |
| *C08F 265/06* | (2006.01) |
| *C08F 220/18* | (2006.01) |
| *C08F 2/22* | (2006.01) |
| *C08F 265/02* | (2006.01) |
| *C08F 265/04* | (2006.01) |
| *C08L 51/00* | (2006.01) |
| *C09D 151/00* | (2006.01) |

(52) U.S. Cl.
CPC ............. *C08F 265/00* (2013.01); *C08F 2/22* (2013.01); *C08F 220/18* (2013.01); *C08F 265/02* (2013.01); *C08F 265/04* (2013.01); *C08F 265/06* (2013.01); *C08L 51/003* (2013.01); *C09D 151/003* (2013.01)

(58) Field of Classification Search
CPC .......... C08F 220/18; C08F 2/22; C08F 265/06
USPC .......................................... 524/800, 804, 832
See application file for complete search history.

(56) References Cited

U.S. PATENT DOCUMENTS

| | | |
|---|---|---|
| 3,438,926 A | 4/1969 | Burke et al. |
| 3,669,899 A | 6/1972 | Vassiliades et al. |
| 5,510,422 A | 4/1996 | Blankenship et al. |
| 5,527,613 A | 6/1996 | Blankenship et al. |
| 6,384,104 B1 | 5/2002 | Chang et al. |
| 2007/0043159 A1 | 2/2007 | Bardman et al. |
| 2007/0043162 A1 | 2/2007 | Bardman et al. |

FOREIGN PATENT DOCUMENTS

| | | |
|---|---|---|
| DE | 197 10 109 A1 | 9/1998 |
| EP | 0 342 944 A2 | 11/1989 |
| EP | 0 565 244 A1 | 10/1993 |
| EP | 0 959 176 A1 | 11/1999 |
| EP | 1 911 881 A1 | 4/2008 |
| JP | 1995157710 A | 6/1995 |
| JP | 1995155557518 A | 6/1995 |
| RU | 2128670 C1 | 4/1999 |
| WO | WO 00/68304 A1 | 11/2000 |
| WO | WO 02/066703 A1 | 8/2002 |

*Primary Examiner* — Gregory R Delcotto
(74) *Attorney, Agent, or Firm* — Karl E. Stauss; Ronald D. Bakule

(57) ABSTRACT

A composition including a core-shell polymeric particle, the core including, when dry, at least one void and the shell including, as polymerized units, from 18% to 50%, by weight based on the weight of the shell, monomer selected from the group consisting of acrylonitrile, methacrylonitrile, acrylamide, methacrylamide, and mixtures thereof is provided. Also provided is a composition including an organic medium and a core-shell polymeric particle, the core including, when dry, at least one void and the shell having a calculated shell-organic medium interaction parameter, $X_{PS}>1.15$ and a method for providing opacity to a dry composition.

8 Claims, No Drawings

CORE-SHELL POLYMERS SUITABLE FOR USE IN ORGANIC MEDIA

This application claims priority to U.S. Provisional Application 61/008,397 filed Dec. 20, 2007.

This invention relates to a core-shell polymeric particle suitable for use in compositions including certain organic media and capable of producing useful levels of opacity in dry compositions. More particularly this invention relates to a core-shell polymeric particle, the core including, when dry, at least one void and the shell including, as polymerized units, from 18% to 50%, by weight based on the weight of the shell, monomer selected from the group consisting of acrylonitrile, methacrylonitrile, acrylamide, methacrylamide, and mixtures thereof. Further, this invention relates to a composition including an organic medium and a core-shell polymeric particle, the core including, when dry, at least one void and the shell having a calculated shell-organic medium interaction parameter, $X_{PS}>1.15$; and a method for providing opacity to a dry composition such as, for example, a coating.

U.S. Pat. No. 6,384,104 discloses latex polymer particles containing a void having at least 4% polymerized crosslinker monomer units in the shell portion of the particle. Further disclosed as suitable non-ionic monomer useful in preparing the shell polymer are from zero to 95% (meth)acrylic acid derivative monomers including acrylonitrile and methacrylonitrile. A long standing need has been the provision of core-shell polymeric particles, the core including, when dry, at least one void, suitable for use in organic media while still providing, when dry, an acceptable level of opacity, the opacity being engendered by the void. The range of core-shell polymers previously disclosed does not meet this need. In the present invention a core-shell polymeric particle having a select composition which meets the need is provided.

In a first aspect of the present invention, there is provided composition comprising a core-shell polymeric particle, said core comprising, when dry, at least one void and said shell comprising, as polymerized units, from 18% to 50%, by weight based on the weight of said shell, monomer selected from the group consisting of acrylonitrile, methacrylonitrile, acrylamide, methacrylamide, and mixtures thereof.

In a second aspect of the present invention there is provided a composition comprising an organic medium and a core-shell polymeric particle, said core comprising, when dry, at least one void and said shell having a calculated shell-organic medium interaction parameter, $X_{PS}>1.15$.

In a third aspect of the present invention there is provided a method for providing opacity to a dry composition comprising: (a) forming a composition comprising an organic medium and a core-shell polymeric particle, said core comprising, when dry, at least one void and said shell having a calculated shell-organic medium interaction parameter, $X_{PS}>1.15$; (b) applying said composition to a substrate; and (c) drying, or allowing to dry, said applied composition.

The present invention relates to a core-shell polymeric particle, the core including, when dry, at least one void and the shell including, as polymerized units, from 18% to 50%, by weight based on the weight of said shell, monomer selected from the group consisting of acrylonitrile, methacrylonitrile, acrylamide, methacrylamide, and mixtures thereof. The core of the core-shell polymeric particle includes, when dry, a core having at least one void capable of scattering visible light, i.e., capable of providing opacity to a composition in which it is included. Core-shell particles including, when dry, one or more void have been disclosed in which the void was generated, for example, by complete or partial hydrolysis and dissolution of the core polymer, by swelling of the core polymer with acid, base or nonionic organic agents with restricted subsequent collapse of the particle, and the like. In a preferred embodiment the core-shell particle is formed by an aqueous multistage emulsion polymerization followed by swelling with a base. Such multistage processes are disclosed in U.S. Pat. Nos. 4,427,836; 4,468,498; 4,469,825; 4,594,363; 4,677,003; 4,910,229; 4,920,160; 4,970,241; 5,157,084; 5,494,971; 5,510,422; 6,139,961; 6,632,531; and 6,896,905; as well as in European Patent Applications EP 267,726, EP 331,421 and EP 915,108.

The stages of the preferred multistage polymers of the present invention include core stage polymer (the "core"), and shell stage polymer (the "shell"). The core and shell may each, independently, include more than one stage. There may also be one or more intermediate stages. An intermediate stage polymer, when present, partially or fully encapsulates the core and itself is partially or fully encapsulated by the shell. The intermediate stage may be prepared by conducting an emulsion polymerization in the presence of the core.

The cores of the preferred multistage polymers are emulsion polymers include, as polymerized units, from 5% to 100%, preferably from 20% to 60%, and more preferably from 30% to 50% by weight, based on the weight of the core, of at least one hydrophilic monoethylenically unsaturated monomer and from 0 to 95 percent by weight, based on the weight of the core stage polymer, of at least one nonionic monoethylenically unsaturated monomer. Cores containing at least five percent by weight, based on the total weight of the core polymer, of at least one hydrophilic monoethylenically unsaturated monomer will generally result in a suitable degree of swelling. The core polymer may be made in a single stage or step of the multistage polymerization or may be made by a plurality of steps in sequence. This process also contemplates, and includes in the term "hydrophilic monoethylenically unsaturated monomer," the use of a nonpolymeric compound containing at least one carboxylic acid group which is absorbed into the core polymer before, during or after the polymerization of the hydrophobic shell polymer as a replacement for the hydrophilic monoethylenically unsaturated monomer in the hydrophilic core polymer, as described in U.S. Pat. No. 4,880,842. In addition, this invention contemplates, and includes in the term "hydrophilic monoethylenically unsaturated monomer," the use of a latent hydrophilic core polymer which contains no hydrophilic monoethylenically unsaturated monomer but which is swellable upon hydrolysis to a hydrophilic core polymer as described in U.S. Pat. No. 5,157,084.

Suitable hydrophilic monoethylenically unsaturated monomer useful for making the core polymer include monoethylenically unsaturated monomers containing acid-functionality such as monomers containing at least one carboxylic acid group including acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate and the like. Acrylic acid and methacrylic acid are preferred. Suitable nonpolymeric compounds containing at least one carboxylic acid group include C.sub.6-C.sub.12 aliphatic or aromatic monocarboxylic acids and dicarboxylic acids, such as benzoic acid, m-toluic acid, p-chlorobenzoic acid, o-acetoxybenzoic acid, azelaic acid, sebacic acid, octanoic acid, cyclohexanecarboxylic acid, lauric acid and monobutyl phthalate and the like. Suitable nonionic monoethylenically unsaturated monomers for making the hydrophilic core polymer include styrene, alpha.-methyl styrene, p-methyl styrene, t-butyl styrene, vinyltoluene, ethylene, vinyl acetate, vinyl chloride, vinylidene chloride, (meth)acrylonitrile, (meth)acrylamide, (C.sub.1-C.sub.20) alkyl or (C.sub.3-C.sub.20) alkenyl esters of (meth)acrylic acid, such as methyl(meth)acrylate, ethyl(meth)acrylate, butyl(meth) acrylate, 2-ethylhexyl(meth)acrylate, hydroxyethyl(meth) acrylate, hydroxypropyl(meth)acrylate, benzyl(meth)acrylate, lauryl(meth)acrylate, oleyl(meth)acrylate, palmityl (meth)acrylate, stearyl(meth)acrylate and the like.

The core, whether obtained by a single stage process or a process involving several stages, has an average particle size of from 50 nm to 1.0 micron, preferably from 100 nm to 300 nm, diameter in unswollen condition. If the core is obtained from a preformed or seed polymer, the seed polymer preferably has an average particle size of from 30 nm to 200 nm.

The core may also optionally contain from 0.1 to 20 percent by weight, alternatively from 0.1 to 10 percent by weight, based on the total weight of the core, of multiethylenically unsaturated monomer, wherein the amount used is generally approximately directly proportional to the amount of hydrophilic monoethylenically unsaturated monomer used; in other words, as the relative amount of hydrophilic monomer increases, it is acceptable to increase the level of multiethylenically unsaturated monomer. Alternatively, the core polymer may contain from 0.1 to 60 percent by weight, based on the total weight of the core polymer, of butadiene.

Suitable multiethylenically unsaturated monomers include comonomers containing at least two addition polymerizable vinylidene groups and are alpha beta ethylenically unsaturated monocarboxylic acid esters of polyhydric alcohols containing 2-6 ester groups. Such comonomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl(meth)acrylates; dicyclopentenyloxy(meth)acrylates; unsaturated esters of glycol monodicyclopentenyl ethers; allyl esters of .alpha., .beta.-unsaturated mono- and dicarboxylic acids having terminal ethylenic unsaturation including allyl methacrylate, allyl acrylate, diallyl maleate, diallyl fumarate, diallyl itaconate and the like.

The shell of the multistage polymer includes, as polymerized units, from 18% to 50%, preferably from 20% to 45%, by weight based on the weight of the shell, monomer selected from the group consisting of acrylonitrile, methacrylonitrile, acrylamide, methacrylamide, and mixtures thereof. Preferred is (meth)acrylonitrile. Styrene is a preferred comonomer. In the event that multiple shells are utilized the composition of the shell herein is taken herein as the total composition of all of the shells. Unless stated otherwise, the first stage of two stage shells herein is characterized as a "tiecoat". In an alternative embodiment the shell further includes, as polymerized units, from 0.1% to 35%, by weight based on the weight of the shell, multiethylenically unsaturated monomer. Suitable multiethylenically unsaturated monomers are those disclosed herein for optional use in the core polymer.

The monomers used and the relative proportions thereof in the shell should be such that it is permeable to an aqueous or gaseous volatile or fixed basic swelling agent capable of swelling the core. The shell may include, as polymerized units, from 0% to 35%, preferably from 0% to 10%, and more preferably from 0.1% to 10%. by weight based on the weight of the shell, of one or more monoethylenically unsaturated monomers containing acid-functionality such as, for example, (meth)acrylic acid, (meth)acryloxypropionic acid, itaconic acid, aconitic acid, maleic acid, maleic anhydride, fumaric acid, crotonic acid, monomethyl maleate, monomethyl fumarate, monomethyl itaconate, and the like. (Meth) acrylic acid is preferred. Preferably, the proportion of acid-functional monoethylenically unsaturated monomer in the shell polymer does not exceed one-third the proportion thereof in the core polymer.

A water-soluble free radical initiator is utilized in the aqueous emulsion polymerization. Suitable water-soluble free radical initiators include hydrogen peroxide; tert-butyl peroxide; alkali metal persulfates such as sodium, potassium and lithium persulfate; ammonium persulfate; and mixtures of such initiators with a reducing agent. Reducing agents include: sulfites, such as alkali metal metabisulfite, hydrosulfite, and hyposulfite; sodium formaldehyde sulfoxylate; and reducing sugars such as ascorbic acid and isoascorbic acid. The amount of initiator is preferably from 0.01% to 3% by weight, based on the total amount of monomer and in a redox system the amount of reducing agent is preferably from 0.01% to 3% by weight based on the total amount of monomer. The temperature may be in the range of about 10° C. to 100° C. In the case of the persulfate systems, the temperature is preferably in the range of 60° C. to 90° C. In the redox systems, the temperature is preferably in the range of 30° C. to 70° C., preferably below 60° C., more preferably in the range of 30° C. to 45° C. The type and amount of initiator may be the same or different in the various stages of the multistage polymerization.

One or more nonionic or anionic emulsifiers, or surfactants, may be used, either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl) phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)laurami-de, N-lauryl-N-polyoxyethylene(3) amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1) ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin (C.sub.14-C.sub.16)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)-ethoxyethyl sulfate. The one or more surfactants are generally used at a level of from 0% to 3% based on the weight of the multistage polymer. The one or more surfactants can be added prior to the addition of any monomer charge, during the addition of a monomer charge or a combination thereof.

The weight ratio of core to an intermediate stage, if present, is typically in the range of from 1:0.5 to 1:10, preferably in the range of from 1:1 to 1:7. The weight ratio of core to shell is typically in the range of from 1:5 to 1:20, preferably in the range of from 1:8 to 1:15.

The amount of shell polymer is typically such as to provide an overall size of the multistage polymer particle of from 70 nm to 4.5 microns, preferably from 100 nm to 3.5 microns, more preferably from 200 nm to 2.0 microns, in unswollen condition (that is, before any neutralization to raise the pH to about 6 or higher) whether the shell polymer is formed in a single stage or in a plurality of stages. When the hydrophilic core polymer is fully encapsulated, it does not titrate with alkali metal bases under analytical conditions of 1 hour and at room temperature. The extent of encapsulation can be determined by removing samples during the course of the shell polymerization and titrating with sodium hydroxide.

The void of the latex polymer particles is preferably produced by swelling the acid-containing core with an aqueous basic swellant that permeates the shell and expands the core. This expansion may involve partial merging of the outer periphery of the core into the pores of the inner periphery of the shell and also partial enlargement or bulging of the shell and the entire particle overall. When the swellant is removed by drying, the shrinkage of the core develops a microvoid, the extent of which depends on the resistance of the shell to restoration to its previous size. Suitable swelling agents for the core include, for example, ammonia, ammonium hydroxide, alkali metal hydroxides (such as sodium hydroxide), and volatile lower aliphatic amines (such as trimethylamine and triethylamine). The swelling step may occur during any of the multistage shell polymerization steps, between any of the staged polymerization steps, or at the end of the multistage polymerization process. Providing the multistage emulsion polymer, monomer and swelling agent under conditions wherein there is no substantial polymerization of the monomer can enhance the extent of swelling of the multistage emulsion polymer as is taught in U.S. Pat. Nos. 6,020,435 and 6,252,004.

In one embodiment the composition of the present invention includes a core-shell polymeric particle and an organic medium having a calculated shell-organic medium interaction parameter, $X_{PS}$>1.15, preferably >1.25. The calculated shell-organic medium interaction parameter, $X_{PS}$, is the calculated interaction parameter between the composition of the shell polymer of the core-shell polymeric particle and the organic medium; it is a measure of the swellability or, in the extreme, the solubility, of the shell polymer in the organic medium. Higher values of $X_{PS}$ correspond to lower swellability. Without being bound by a particular theory, it is believed that higher values of $X_{PS}$ correspond to higher levels of core-shell polymeric particle integrity in compositions including the core-shell polymeric particles of this invention and an organic medium and, thereby, provide desired higher levels of opacity in dry compositions. The organic medium may include one or more organic compounds such as, for example, aliphatic or acyclic saturated hydrocarbons including from 0% to 3%, by weight based on the weight of the organic medium, aromatic compounds in the case of a shell including 20% by weight copolymerized AN; higher levels of aromatic solvent may be included in the organic medium when copolymerized AN level is higher, in each case consistent with the calculated shell-organic medium interaction parameter, $X_{PS}$>1.15, preferably >1.25. The organic medium may be provided independently, as the medium in which further compositions are dissolved or dispersed, or combinations thereof. In certain preferred embodiments solutions of polymer, other than the core-shell polymeric particle of this invention, in hydrocarbon solvents are employed such as, for example, solutions of alkyd polymer, particularly long oil alkyd polymer. In compositions including the core-shell polymeric particle and an organic medium the weight ratio of core-shell polymeric particle (solids basis)/organic medium is typically from 1/99 to 99/1, more typically from 2/98 to 50/50, and most typically from 3/97 to 25/75.

In one embodiment of the present invention, there are provided certain compositions including the core-shell polymeric particle of the invention, optionally an organic medium, and, further optionally an inorganic particle, which compositions may find utility, for example, as sunscreen compositions or as coating compositions. The amount of inorganic particles included in an aqueous coating composition is from 0 to 95 volume %, based on the total dry volume of the composition and inorganic particles. Typically, the coating composition, when used to prepare dried coatings, has a solids level in the range of from 20 to 50 volume %, based on the volume of the composition. A suitable viscosity range for such compositions is from 50 to 130 Krebs units (KU), preferably from 70 to 120 KU, and more preferably from 90 to 110 KU.

Inorganic particles include: metal oxides such as zinc oxide, cerium oxide, tin oxide, antimony oxide, zirconium oxide, chromium oxide, iron oxide, lead oxide, aluminum oxide, silicon oxide, titanium dioxide; zinc sulfide, lithopone, calcium carbonate, calcium sulfate, barium sulfate, mica, clay, calcined clay, feldspar, nepheline syenite, wollastonite, diatomaceous earth, alumina silicates, and talc. In one embodiment, the inorganic particles may have a particle size which is from 10 to 1000 nm, preferably from 10 to 500 nm. Examples of desired inorganic particles with a particle size of less than 1000 nm include zinc oxide, silicon oxide, titanium dioxide, and iron oxide.

The composition may optionally contain organic pigment particles. Suitable organic pigments also include plastic pigments such as solid bead pigments and microspheres not of the present invention containing voids or vesicles. Examples of solid bead pigments include polystyrene and polyvinyl chloride beads. Examples of microsphere pigments, which include polymer particles containing one or more voids include Ropaque™ opaque polymers and vesiculated polymer particles, as disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776; and U.S. Pat. No. 5,510,422. Other suitable pigments include, for example, Expancel™ 551 DE20 acrylonitrile/vinyl chloride expanded particles (Expancel Inc. Duluth Ga.); Sil-Cell™ 35/34 a sodium potassium aluminum silicate particles (Silbrico Corporation, Hodgkins Ill.); Dualite™ 27 polyvinylidene chloride copolymer coated with $CaCO_3$ (Pierce and Stevens Corporation, Buffalo N.Y.); Fillitte™ 150 ceramic spherical particles (Trelleborg Fillite Inc. Norcross Ga.); Microbeads™ 4A soda lime particles (Cataphote Inc.); Sphericell™ hollow glass particles (Potter Industries Inc. Valley Forge Pa.); Eccosphere™ hollow glass spheres (New Metals & Chemicals Ltd.; Essex England); Z-light™ Sphere W-1200 ceramic hollow spheres (3M St. Paul Minn.); Scotchlite™ K46 glass bubbles (3M St. Paul Minn.); Vistamer™ UH 1500 polyethylene particles; and Vistamer™ HD 1800 polyethylene particles (Fluoro-Seal Inc., Houston Tex.).

The compositions including inorganic particles are prepared by techniques which are well known in the coatings art. First, the inorganic particles are typically are well dispersed in a medium under high shear such as is afforded by a COWLES® mixer. Then, the core-shell polymeric particles are added under low shear stirring along with other coatings adjuvants as desired. The composition may further contain film-forming or non-film-forming solution polymer, and conventional coatings adjuvants such as, for example, driers, plasticizers, curing agents, neutralizers, thickeners, rheology modifiers, biocides, antifoaming agents, UV absorbers, fluorescent brighteners, light or heat stabilizers, chelating agents, dispersants, colorants, waxes, water-repellants, and anti-oxidants.

Conventional coatings application methods such as, for example, brushing, rolling, and spraying methods such as, for example, air-atomized spray, air-assisted spray, airless spray, high volume low pressure spray, and air-assisted airless spray may be used to apply the composition of this invention. Additionally, for some systems, other application techniques may be used to apply the composition, such as, caulk gun, roll coaters, and curtain coaters. The aqueous polymer composition may be advantageously applied to substrates such as, for example, plastic, wood, metal, primed surfaces, previously painted surfaces, weathered painted surfaces, glass, paper, paperboard, leather, composites, and cementitious substrates. Drying is typically allowed to proceed under ambient conditions such as, for example, at 0° C. to 35° C. but may be accelerated with higher temperatures, air flow, low humidity, actinic energy such as, for example, e-beam, UV, visible, infrared, or microwave radiation, or sonic energy.

ABBREVIATIONS

SDS=sodium dodecyl benzene sulfonate (23%)
LOFA=Linseed oil fatty acid
ALMA=Allyl methacrylate
STY=Styrene
AN=Acrylonitrile
EDTA=Ethylene Diamine Tetra acetic Acid, tetra sodium salt
t-BHP=tert-Butyl Hydroperoxide
IAA=Isoascorbic Acid
DVB=Divinyl benzene (80%)
NaOH=Sodium hydroxide (50% in water)
DI water=Deionized water

CORE POLYMER A

A core polymer was prepared according to the procedure of Examples 1 through 16 in U.S. Pat. No. 6,020,435. The filtered dispersion had a solids content of 32.0% and an average particle size of 140 nm.

COMPARATIVE EXAMPLE A

A 5-liter, four necked round bottom flask was equipped with paddle stirrer, thermometer, nitrogen inlet, and reflux condenser. DI water, 940 g, was added to the kettle and heated to 89° C. under a nitrogen atmosphere. To the heated kettle was added 4.8 g of sodium persulfate dissolved in 30 g of DI water. This was immediately followed by 281.3 g of Core Polymer A. A monomer emulsion (ME I) which was prepared by mixing 370 g of DI water, 18.0 g of SDS, 866.2 g of STY, 189.0 g of AN, 6.3 g of LOFA, and 3.2 g of ALMA was added to the kettle at a rate of 6.0 g/min at a temperature of 78° C. Two minutes after the start of the ME I feed to the kettle, a solution of 12.6 g of acrylic acid mixed with 30 g of DI water was added to the kettle. After 45 minutes of adding the ME I to the kettle the feed rate was increased to 25 g/min and a mixture of 1.2 g of sodium persulfate dissolved in 90 g of DI water was co-fed to the kettle at a rate of 1.6 g/min. The temperature of the reaction mixture was allowed to increase to 92° C. Upon completion of the ME I and co-feed, a solution of 0.02 g of ferrous sulfate dissolved in 20 g of DI water was mixed with a solution of 0.02 g of EDTA dissolved in two g of DI water. This mixture was added to the kettle along with a separate solution of 1.0 g of IAA dissolved in 20 g of DI water. The batch was then held at 90° C. for fifteen minutes. A second monomer emulsion (ME II) which was prepared by mixing 85 g of DI water, 2.4 g of SDS, 189.0 g of STY, and 3.0 g of 4-hydroxy TEMPO was added to the kettle at a rate of 45 g/min along with 200 g of hot DI water. A solution of 38.5 g of NaOH (50%) in 750 g of hot DI water was then added to the kettle over ten minutes. The batch was then held for five minutes at 85° C. A solution of 1.8 g of t-BHP mixed with 35 g of DI water was then added to the kettle and a solution of 0.96 g IAA mixed with 60 g of DI water was co-fed to the kettle at a rate of 3.0 g/min. After completion of the IAA co-feed the batch was cooled to room temperature and filtered to remove any coagulum formed. The final latex had a solids content of 32.2%.

EXAMPLES 1-8

Core-shell polymers of Examples 1-8 were prepared according to the process of Comparative Example A with the exception that the compositions of monomer emulsion ME I was varied and the final solids content varied as presented in Table 1.1. Additionally, in Example 8 the monomer emulsion ME II composition was 85 g DI water, 2.4 g SDS, 181.0 g STY, 10.0 g DVB (80%), and 3.0 g 4-hydroxy TEMPO.

TABLE 1.1

Compositions of ME I and final solids content for Examples 1-8

| Example | ME I composition | Final Solids Content (wt. %) |
|---|---|---|
| 1 | 370 g DI water, 18.0 g SDS, 803.2 g STY, 252.0 g AN, 6.3 g LOFA, and 3.2 g ALMA | 31.5 |
| 2 | 370 g DI water, 18.0 g SDS, 740.2 g STY, 315.0 g AN, 6.3 g LOFA, and 3.2 g ALMA | 31.5 |
| 3 | 370 g DI water, 18.0 g SDS, 677.2 g STY, 378.0 g AN, 6.3 g LOFA, and 3.2 g ALMA | 31.6 |
| 4 | 370 g DI water, 18.0 g SDS, 614.2 g STY, 441.0 g AN, 6.3 g LOFA, and 3.2 g ALMA | 32.4 |
| 5 | 370 g DI water, 18.0 g SDS, 551.2 g STY, 504.0 g AN, 6.3 g LOFA, and 3.2 g ALMA | 31.8 |
| 6 | 370 g DI water, 18.0 g SDS, 488.3 g STY, 567.0 g AN, 6.3 g LOFA, and 3.2 g ALMA | 31.8 |
| 7 | 370 g DI water, 18.0 g SDS, 425.2 g STY, 630.0 g AN, 6.3 g LOFA, and 3.2 g ALMA | 31.6 |
| 8 | 370 g DI water, 18.0 g SDS, 803.2 g STY, 252.0 g AN, 6.3 g LOFA, and 3.2 g ALMA | 31.8 |

COMPARATIVE EXAMPLE B

A 5-liter, four necked round bottom flask was equipped with paddle stirrer, thermometer, nitrogen inlet, and reflux condenser. DI water, 940 g, was added to the kettle and heated to 89° C. under a nitrogen atmosphere. To the heated kettle was added 4.8 g of sodium persulfate dissolved in 30 g of DI water. This was immediately followed by 281.3 g of the core prepared in Example #1. A monomer emulsion (ME I) which was prepared by mixing 90 g of DI water, 6.0 g of SDS, 84.6 g of MMA, 5.4 g of glacial MAA, 36.0 g of AN, and 54.0 g of STY was added to the kettle at a rate of 4.8 g/min at a temperature of 78° C. Upon completion of ME I, a second monomer emulsion (ME II) which was prepared by mixing 280 g of DI water, 12.0 g of SDS, 753.3 g of styrene, 162 g of AN, 5.4 g of LOFA, and 2.7 g of ALMA was added to the kettle over 60 minutes along with a co-feed mixture of 1.2 g of sodium persulfate dissolved in 90 g of DI water. The temperature of the reaction mixture was allowed to increase to 92° C. Upon completion of the ME II and co-feed, a solution of 0.02 g of ferrous sulfate dissolved in 20 g of DI water was mixed with a solution of 0.02 g of EDTA dissolved in two g of DI water. This mixture was added to the kettle along with a separate solution of 1.0 g of IAA dissolved in 20 g of DI water. The batch was then held at 90° C. for fifteen minutes. A third monomer emulsion (ME III) which was prepared by mixing 70 g of DI water, 2.0 g of SDS, 162.0 g of styrene, and 2.4 g of 4-hydroxy TEMPO was added to the kettle at a rate of 45 g/min. A solution of 31.9 g of NaOH (50%) in 750 g of hot DI water was then added to the kettle over ten minutes. The batch was then held for five minutes at 85° C. A solution of 1.8 g of t-BHP mixed with 35 g of DI water was then added to the kettle and a solution of 0.96 g IAA mixed with 60 g of DI water was co-feed to the kettle at a rate of 3.0 g/min. After completion of the IAA co-feed the batch was cooled to room temperature and filtered to remove any coagulum formed. The final latex had a solids content of 32.7%.

EXAMPLES 9-13 AND COMPARATIVE EXAMPLE C

Core-shell polymers of Examples 9-13 and Comparative Example C were prepared according to the process of Comparative Example B with the exception that the compositions of monomer emulsion ME II was varied and the final solids content varied as presented in Table 9.1.

TABLE 9.1

Compositions of ME II and final solids content for Examples 9-13 and Comp. C

| Example | ME II composition | Final Solids Content (wt. %) |
|---|---|---|
| 9 | 280 g DI water, 12.0 g SDS, 699.3 g STY, 216.0 g AN, 5.4 g LOFA, and 2.7 g ALMA | 32.8 |
| 10 | 280 g DI water, 12.0 g SDS, 645.3 g STY, 270.0 g AN, 5.4 g LOFA, and 2.7 g ALMA | 33.1 |
| 11 | 280 g DI water, 12.0 g SDS, 504.9 g STY, 410.4 g AN, 5.4 g LOFA, and 2.7 g ALMA | 31.5 |
| 12 | 280 g DI water, 12.0 g SDS, 429.3 g STY, 486.0 g AN, 5.4 g of LOFA, and 2.7 g ALMA | 33.0 |
| 13 | 280 g DI water, 12.0 g SDS, 321.3 g STY, 594.0 g AN, 5.4 g LOFA, and 2.7 g ALMA | 34.7 |
| Comp. C | 280 g DI water, 12.0 g SDS, 267.3 g STY, 648.0 g AN, 5.4 g LOFA, and 2.7 g ALMA | 26.7 |

EXAMPLE 14

Preparation of Coating Compositions. Preparation of a solvent-borne alkyd pigmentless coating composition. To a chilled water cooled grind pot the following ingredients were added and mixed under high shear (3,000 rpm) for 15 minutes using a Cowles-type mixing blade. The temperature of the grind was maintained below about 30° C. throughout the process.

TABLE 14.1

Low Aromatic Formulation

| Material | Amount (g) |
|---|---|
| Beckosol ™ 10-060 | 469.5 |
| Odorless Mineral Spirits | 52.0 |
| Bentone ™ 38 | 4.3 |
| Anti-Terra ™ -U | 2.1 |
| Mix for 5 mins | |
| Kelecin ™ F | 8.5 |
| Cobalt Nap-All ™ 6% | 2.8 |
| Calcium Nap-All ™ 4% | 5.5 |
| Zirconium Hex-Cem ™ 6% | 3.1 |
| Skino ™ #2 | 2.7 |
| Toluene | 0.0 |
| Odorless Mineral Spirits | 58.8 |

For some testing an amount of Odorless Mineral Spirits ("OMS") was removed and replaced with an equal weight of toluene. Toluene was used at a level of 3% and 10% based on the total amount of solvent in the formulation including that which is added via other materials.

Order of addition for alkyd pigmented coating compositions:
Pigment-less alkyd coating procedure was the same without extender pigments and TiO2.
Grind
1. Binder, OMS, Bentone™ 38, and Anti-Terr-U were all weighed in grind pot and mixed at 1500 rpm's for 5 minutes.
2. Kelecin™ F, TiO2, and the extenders were added individually and grinded at 3000 rpm's for 15 minutes.

Letdown
3. The Binder and all other ingredients (OMS, Cobalt Nap-All™ 6%, Calcium Nap-All™ 4%, Zirconium Hex-Cem™ 6%, and last OMS) were added. Also added the core-shell polymeric particles at the same time, in the order of addition for the formulation. Let mix for additional 15 mins at 3000 rpm's for good incorporation. Set aside for several hours for de-aeration Beckosol™ and Kelecin™ are trademarks of Reichhold, Inc. Bentone™ is a trademark of ConocoPhillips Co., Anti-terra™ is a trademark of Byk, Inc. Nap-All™ and Hex-Cem™ are trademarks of OMG Americas, Inc.

Preparation of Coating Compositions Including Core-Shell Polymeric particles. Aliquots of the above alkyd pigmentless coating compositions were placed in glass jars. The amount of alkyd pigmentless coating to core-shell polymeric particle solids were adjusted and maintained within experiments. For most studies the ratio of alkyd resin solids to opaque polymer solids was 85:15 by weight. core-shell polymeric particle emulsions were added with good mixing. A standard laboratory three blade propeller was used. The speed was adjusted to the maximum speed which did not incorporate air into the paint. Mixing time was at least 10 mins. Samples were allowed to equilibrate at least overnight before testing. Some paints were subjected to heat aging at 50° C. for various periods of time, usually 10 or 30 days.

EXAMPLE 15

Evaluation of Coating Compositions

Drawdowns were made with a 7 mil Dow bar on Leneta 5C opacity charts and allowed to fully dry before measuring the reflectance with a Byk-Gardner color guide 45°/0° reflectometer. Y reflectance was recorded (Y). Film thickness of the chart and the chart with the applied film was measured in mils using an electronic Mitutoyo dial comparator. The difference in these measurements was the thickness of the film (T). The following equation was used to calculate the scattering of the core-shell polymeric particle-containing paints per mil film thickness:

$S = (Y/(100-Y))/T$. Heat age collapse is calculated based on scattering before and after heat aging. In Table 15.1 the organic medium composition was 97% OMS/3% toluene, by weight. In Table 15.2 the organic medium composition was 100% OMS, by weight.

TABLE 15.1

Evaluation of coating compositions

| | Key Variables | | Coating Performance | | | | | | |
|---|---|---|---|---|---|---|---|---|---|
| Core-shell polymeric particles of Example | AN Level Shell, wt % | Tie Coat AN wt. % | Intital Scatter | Initial Gloss 20° | Yellow Index | HeatAge Collapse | HeatAge Gloss 20° | HeatAge Yel. Ind. | HeatAge Viscosity (1-Low 5-Solid) |
| Comp. A | 15 | No TC | 0.78 | 69 | 8.4 | −16% | 1 | 10.9 | 3 |
| 1 | 20 | No TC | 0.91 | 74 | 8.8 | 9% | 4 | 10.6 | 2 |
| 2 | 25 | No TC | 0.87 | 64 | 8.9 | −6% | 9 | 10.6 | 2 |
| 8 | 20 | No TC | 0.89 | 77 | 8.7 | −4% | 34 | 10.2 | 3 |
| 3 | 30 | No TC | 0.71 | 65 | 9.4 | 19% | 66 | 10.8 | 2 |
| 4 | 35 | No TC | 0.77 | 73 | 9.5 | −1% | 75 | 10.8 | 2 |
| 5 | 40 | No TC | 0.74 | 64 | 9.9 | −1% | 69 | 11.4 | 2 |
| 6 | 45 | No TC | 0.53 | 72 | 10.7 | −3% | 75 | 12.8 | 2 |
| 7 | 50 | No TC | 0.44 | 51 | 11.8 | 0% | 47 | 14.5 | 1 |
| 11 | 35 | 20 | 0.70 | 72 | 9.6 | −16% | 16 | 11.7 | 2 |
| Comp. B | 15 | 20 | 0.85 | 73 | 9.0 | −40% | 1 | 12.6 | 4 |
| 10 | 25 | 20 | 0.93 | 71 | 8.9 | −5% | 9 | 10.7 | 3 |
| 9 | 20 | 20 | 0.96 | 58 | 9.0 | −8% | 2 | 10.8 | 3 |
| 12 | 45 | 20 | 0.72 | 78 | 9.7 | −3% | 57 | 11.6 | 3 |
| 13 | 55 | 20 | 0.41 | 53 | 11.3 | −9% | 51 | 13.8 | 2 |
| Comp. C | 60 | 20 | 0.10 | 56 | 13.6 | −37% | 12 | 16.6 | 2 |
| 85 parts alkyd; 15 parts core-shell polymer, by wt. | | | | | | | | | |
| Comp. A | 15 | No TC | 0.38 | 47 | 11.9 | −6% | 18 | 14.0 | 2 |
| 1 | 20 | No TC | 0.38 | 39 | 12.0 | −1% | 21 | 14.0 | 3 |
| 2 | 25 | No TC | 0.41 | 46 | 11.8 | −3% | 29 | 13.9 | 2 |
| 8 | 20 | No TC | 0.39 | 42 | 12.2 | 9% | 24 | 14.3 | 3 |
| 3 | 30 | No TC | 0.37 | 61 | 12.1 | −4% | 57 | 14.0 | 1 |
| 4 | 35 | No TC | 0.37 | 63 | 12.2 | 1% | 62 | 13.8 | 1 |
| 5 | 40 | No TC | 0.34 | 54 | 12.3 | 5% | 50 | 14.5 | 1 |
| 6 | 45 | No TC | 0.26 | 67 | 12.9 | −5% | 64 | 14.9 | 1 |
| 7 | 50 | No TC | 0.23 | 53 | 13.9 | −13% | 46 | 15.1 | 1 |
| 11 | 35 | 20 | 0.33 | 58 | 12.3 | −12% | 81 | 14.6 | 1 |
| Comp. B | 15 | 20 | 0.45 | 45 | 12.3 | −26% | 21 | 14.0 | 1 |
| 10 | 25 | 20 | 0.40 | 56 | 11.9 | 8% | 37 | 14.1 | 1 |
| 9 | 20 | 20 | 0.39 | 40 | 12.2 | −15% | 23 | 15.2 | 1 |
| 12 | 45 | 20 | 0.37 | 49 | 11.9 | −21% | 37 | 15.4 | 1 |
| 13 | 55 | 20 | 0.19 | 38 | 13.6 | −26% | 29 | 16.9 | 1 |
| Comp. C | 60 | 20 | 0.05 | 55 | 14.5 | −29% | 60 | 18.0 | 1 |

92 parts alkyd; 8 parts core-shell polymer, by wt.

TABLE 15.2

Evaluation of coating compositions

| | Key Variables | | Coating Performance | | | | | | |
|---|---|---|---|---|---|---|---|---|---|
| Core-shell polymeric particles of Example | AN Level Shell, wt % | Tie Coat AN wt. % | Intital Scatter | Initial Gloss 20° | Yellow Index | HeatAge Collapse | HeatAge Gloss 20° | HeatAge Yel. Ind. | HeatAge Viscosity (1-Low 5-Solid) |
| 1 | 20 | No TC | 0.80 | 54 | 9.1 | 6% | 2 | 10 | 2 |
| 8 | 20 | No TC | 0.97 | 47 | 9.6 | 0% | 5 | 11 | 3 |
| 4 | 35 | No TC | 0.73 | 45 | 10.6 | −6% | 75 | 12 | 2 |
| 7 | 50 | No TC | 0.42 | 31 | 12.9 | −10% | 32 | 14 | 1 |
| 9 | 20 | 20 | 0.84 | 26 | 9.9 | −13% | 9 | 11 | 2 |
| 11 | 38 | 20 | 0.66 | 53 | 10.8 | 3% | 8 | 12 | 3 |
| 12 | 45 | 20 | 0.75 | 53 | 10.7 | −7% | 20 | 12 | 3 |
| 13 | 55 | 20 | 0.41 | 19 | 12.5 | −9% | 51 | 15 | 2 |
| Comp. C | 60 | 20 | 0.10 | 27 | 15.5 | −38% | 3 | 17 | 2 |
| 85 parts alkyd; 15 parts core-shell polymer, by wt. | | | | | | | | | |
| 1 | 20 | No TC | 0.40 | 31 | 12.8 | −18% | 47 | 14 | 2 |
| 8 | 20 | No TC | 0.37 | 36 | 13.1 | 6% | 51 | 14 | 2 |
| 4 | 35 | No TC | 0.37 | 52 | 13.3 | −4% | 71 | 14 | 2 |
| 7 | 50 | No TC | 0.20 | 39 | 14.7 | −10% | 72 | 16 | 2 |

TABLE 15.2-continued

| | | | | | | | | | |
|---|---|---|---|---|---|---|---|---|---|
| 9 | 20 | 20 | 0.45 | 56 | 12.3 | −8% | 76 | 13 | 1 |
| 11 | 38 | 20 | 0.31 | 46 | 13.3 | 0% | 69 | 15 | 2 |
| 12 | 45 | 20 | 0.36 | 58 | 13.3 | −15% | 69 | 15 | 2 |
| 13 | 55 | 20 | 0.19 | 22 | 14.8 | −29% | 42 | 17 | 2 |
| Comp. C | 60 | 20 | 0.04 | 30 | 15.8 | −13% | 65 | 17 | 2 |

92 parts alkyd; 8 parts core-shell polymer, by wt.

EXAMPLE 16

Solubility Interaction Parameter Calculation

Example: Copolymer in a Binary Solvent
Subscripts:

| Polymer: | P for polymer or copolymer |
| --- | --- |
| | a, b, etc. for individual monomers |
| Solvent: | S for solvent or solvent mixtures |
| | m, n, etc. for individual solvents |

$X_{PS}$ herein was calculated as follows; w is weight fraction.

$$X_{PS} = w_a w_m X_{am} + w_a w_n X_{an} + w_b w_m X_{bm} + w_b w_n X_{bn} - w_a w_b X_{ab} - w_m w_n X_{mn}, \quad (1)$$

where the individual interaction parameters are given by:

$$X_{ij} = v_o (\delta_i - \delta_j)_2 / (RT),$$

where $\delta_i$ is the Hildebrand solubility parameter [$(cal/cm^3)^{1/2}$] of each individual monomer or solvent and $v_o$ is taken as 100 cm$^3$/mole. Equation 1 can be collapsed to a system with fewer monomers or solvents and likewise could be expanded to include a greater number.

Solubility parameters are found, for example in: "Polymer Handbook"; 4$^{th}$ Edition; J. Brandrup, E. H. Immergut, and E. A. Grulke, Editors; John Wiley and Sons; 1999. Sec.VII/pages 688-711

Hildebrand values for the Exxon solvents (Solvesso™ 100, Solvesso™ 150, and Solvesso™ 200) were calculated from the Kauri-Butanol Value found in the product notes for these materials. Hildebrand values were calculated from the following equation:

Hildebrand Value=0.020 KB+6.937

EXAMPLE 17

Evaluation of Coating Compositions

TABLE 17.1

Evaluation of coating compositions including various organic media
Solubility Interaction Parameters (χ)

| | Solvent | | | Monomer-Solvent | | Fraction of AN in Styrene - No Tie Coat Process | | | | | | | | | | | |
|---|---|---|---|---|---|---|---|---|---|---|---|---|---|---|---|---|---|
| | % x | δx | χox | χSx | χAx | 0.00 | 0.05 | 0.15 | 0.20 | 0.25 | 0.30 | 0.35 | 0.40 | 0.45 | 0.50 | 0.55 | 0.60 |
| 27% blend with OMS | | | | | | | | | | | $X_{PS}$ | | | | | | |
| Odorless Mineral Spirits | 0.27 | 7.50 | 0.00 | 0.44 | 10.72 | | | | 1.40 | | | 2.49 | | | | | |
| Shellsol 16 | 0.27 | 7.90 | 0.03 | 0.25 | 9.66 | | | | 1.30 | | | 2.35 | | | | | |
| Solvesso 100 (Aromatic 100) | 0.27 | 8.70 | 0.25 | 0.03 | 7.71 | | | | 1.10 | | | 2.08 | | | | | |
| Solvesso 150 (Aromatic 150) | 0.27 | 8.70 | 0.25 | 0.03 | 7.71 | | | | 1.10 | | | 2.08 | | | | | |
| Solvesso 200 (Aromatic 200) | 0.27 | 8.80 | 0.29 | 0.02 | 7.48 | | | | 1.08 | | | 2.05 | | | | | |
| Toluene | 0.27 | 8.90 | 0.34 | 0.01 | 7.26 | | | | 1.06 | | | 2.02 | | | | | |
| OMS - Toluene blends | | | | | | | | | | | $X_{PS}$ | | | | | | |
| toluene 0% | 0.00 | 8.90 | 0.34 | 0.01 | 7.26 | 1.11 | 1.40 | 1.73 | 2.09 | 2.49 | 2.92 | 3.38 | 3.88 | 4.41 | 4.97 | | |
| toluene 3% | 0.03 | 8.90 | 0.34 | 0.01 | 7.26 | 1.08 | 1.36 | 1.69 | 2.04 | 2.43 | 2.86 | 3.31 | 3.81 | 4.41 | 4.97 | | |
| toluene 10% | 0.10 | 8.90 | 0.34 | 0.01 | 7.26 | 0.99 | 1.27 | | | | | | | | | | |

| Material | δ | Interaction Parameters | | Temp (° C.) | 20 |
|---|---|---|---|---|---|
| Styrene | 9.1 | χAS | 6.82 | | |
| AN | 15.4 | χSo | 0.44 | | |
| OMS | 7.5 | χAo | 10.72 | | |
| | | | Fail | | |

| | Solvent | | | Monomer-Solvent | | Fraction of AN in Styrene - Tie Coat Process (Tie Coat and Shell) | | | | | | | | | | | |
|---|---|---|---|---|---|---|---|---|---|---|---|---|---|---|---|---|---|
| | % x | δx | χox | χSx | χAx | 0.00 | 0.05 | 0.16 | 0.20 | 0.24 | 0.29 | 0.33 | 0.37 | 0.41 | 0.46 | 0.50 | 0.54 |
| 27% blend with OMS | | | | | | | | | | | $X_{PS}$ | | | | | | |
| Odorless Mineral Spirits | 0.27 | 7.50 | 0.00 | 0.44 | 10.72 | | | | 1.40 | | | 2.31 | | | | | |
| Shellsol 16 | 0.27 | 7.90 | 0.03 | 0.25 | 9.66 | | | | 1.30 | | | 2.18 | | | | | |

TABLE 17.1-continued

Evaluation of coating compositions including various organic media
Solubility Interaction Parameters ($\chi$)

| | | | | | | | | | | | | | | | | | | |
|---|---|---|---|---|---|---|---|---|---|---|---|---|---|---|---|---|---|---|
| Solvesso 100 (Aromatic 100) | 0.27 | 8.70 | 0.25 | 0.03 | 7.71 | | | | | 1.10 | | 1.92 | | | | | | |
| Solvesso 150 (Aromatic 150) | 0.27 | 8.70 | 0.25 | 0.03 | 7.71 | | | | | 1.10 | | 1.92 | | | | | | |
| Solvesso 200 (Aromatic 200) | 0.27 | 8.80 | 0.29 | 0.02 | 7.48 | | | | | 1.08 | | 1.89 | | | | | | |
| Toluene | 0.27 | 8.90 | 0.34 | 0.01 | 7.26 | | | | | 1.06 | | 1.86 | | | | | | |
| OMS - Toluene blends | | | | | | | | | | | $\chi_{PS}$ | | | | | | | |
| toluene 0% | 0.00 | 8.90 | 0.34 | 0.01 | 7.26 | 0.44 | 0.63 | 1.15 | 1.40 | 1.68 | 1.99 | 2.31 | 2.67 | 3.04 | 3.45 | 3.88 | 4.33 |
| toluene 3% | 0.03 | 8.90 | 0.34 | 0.01 | 7.26 | | | 1.12 | 1.36 | 1.64 | 1.94 | 2.26 | 2.61 | 2.98 | 3.38 | 3.81 | 4.26 |
| toluene 10% | 0.10 | 8.90 | 0.34 | 0.01 | 7.26 | | | 1.03 | 1.27 | 1.54 | 1.83 | 2.14 | 2.48 | 2.85 | 3.24 | 3.65 | 4.09 |

| Material | δ | Interaction Parameters | | Temp (° C.) | 20 |
|---|---|---|---|---|---|
| Styrene | 9.1 | $\chi AS$ | 6.82 | | |
| AN | 15.4 | $\chi So$ | 0.44 | | |
| OMS | 7.5 | $\chi Ao$ | 10.72 | | |
| | | | Fail | | |

| | Solvent | | Monomer-Solvent | | Fraction of AN in Styrene - No Tie Coat Process | | | | | | | | | | | | | |
|---|---|---|---|---|---|---|---|---|---|---|---|---|---|---|---|---|---|---|
| | % x | δx | $\chi$ox | $\chi$Sx | $\chi$Ax | 0.00 | 0.05 | 0.15 | 0.20 | 0.25 | 0.30 | 0.35 | 0.40 | 0.45 | 0.50 | 0.55 | 0.60 |
| 27% blend with OMS | | | | | | | | | | | $\chi_{PS}$ | | | | | | | |
| Odorless Mineral Spirits | 0.27 | 7.50 | 0.00 | 0.40 | 9.72 | | | | | 1.27 | | 2.26 | | | | | |
| Shellsol 16 | 0.27 | 7.90 | 0.02 | 0.22 | 8.76 | | | | | 1.18 | | 2.13 | | | | | |
| Solvesso 100 (Aromatic 100) | 0.27 | 8.70 | 0.22 | 0.02 | 6.99 | | | | | 1.00 | | 1.89 | | | | | |
| Solvesso 150 (Aromatic 150) | 0.27 | 8.70 | 0.22 | 0.02 | 6.99 | | | | | 1.00 | | 1.89 | | | | | |
| Solvesso 200 (Aromatic 200) | 0.27 | 8.80 | 0.26 | 0.01 | 6.79 | | | | | 0.98 | | 1.86 | | | | | |
| Toluene | 0.27 | 8.90 | 0.31 | 0.01 | 6.58 | | | | | 0.96 | | 1.83 | | | | | |
| OMS - Toluene blends | | | | | | | | | | | $\chi_{PS}$ | | | | | | | |
| toluene 0% | 0.00 | 8.90 | 0.31 | 0.01 | 6.58 | 0.40 | 0.57 | 1.01 | 1.27 | 1.57 | 1.90 | 2.26 | 2.64 | 3.06 | 3.52 | 4.00 | 4.51 |
| toluene 3% | 0.03 | 8.90 | 0.31 | 0.01 | 6.58 | 0.38 | 0.55 | 0.98 | 1.24 | 1.53 | 1.85 | 2.21 | 2.59 | 3.01 | 3.45 | 4.00 | 4.51 |
| toluene 10% | 0.10 | 8.90 | 0.31 | 0.01 | 6.58 | | | | | 1.15 | 1.44 | | | | | | |

| Material | δ | Interaction Parameters | | Temp (° C.) | 50 |
|---|---|---|---|---|---|
| Styrene | 9.1 | $\chi AS$ | 6.18 | | |
| AN | 15.4 | $\chi So$ | 0.40 | | |
| OMS | 7.5 | $\chi Ao$ | 9.72 | | |
| | | | Fail | | |

| | Solvent | | Monomer-Solvent | | Fraction of AN in Styrene - Tie Coat Process (AN for TC and Shell) | | | | | | | | | | | | | |
|---|---|---|---|---|---|---|---|---|---|---|---|---|---|---|---|---|---|---|
| | % x | δx | $\chi$ox | $\chi$Sx | $\chi$Ax | 0.00 | 0.05 | 0.16 | 0.20 | 0.24 | 0.29 | 0.33 | 0.37 | 0.41 | 0.46 | 0.50 | 0.54 |
| 27% blend with OMS | | | | | | | | | | | $\chi_{PS}$ | | | | | | | |
| Odorless Mineral Spirits | 0.27 | 7.50 | 0.00 | 0.40 | 9.72 | | | | | 1.27 | | 2.10 | | | | | |
| Shellsol 16 | 0.27 | 7.90 | 0.02 | 0.22 | 8.76 | | | | | 1.18 | | 1.98 | | | | | |
| Solvesso 100 (Aromatic 100) | 0.27 | 8.70 | 0.22 | 0.02 | 6.99 | | | | | 1.00 | | 1.74 | | | | | |
| Solvesso 150 (Aromatic 150) | 0.27 | 8.70 | 0.22 | 0.02 | 6.99 | | | | | 1.00 | | 1.74 | | | | | |
| Solvesso 200 (Aromatic 200) | 0.27 | 8.80 | 0.26 | 0.01 | 6.79 | | | | | 0.98 | | 1.72 | | | | | |
| Toluene | 0.27 | 8.90 | 0.31 | 0.01 | 6.58 | | | | | 0.96 | | 1.69 | | | | | |
| OMS - Toluene blends | | | | | | | | | | | $\chi_{PS}$ | | | | | | | |
| toluene 0% | 0.00 | 8.90 | 0.31 | 0.01 | 6.58 | 0.40 | 0.57 | 1.05 | 1.27 | 1.53 | 1.80 | 2.10 | 2.42 | 2.76 | 3.13 | 3.52 | 3.93 |
| toluene 3% | 0.03 | 8.90 | 0.31 | 0.01 | 6.58 | 0.38 | 0.55 | 1.01 | 1.24 | 1.49 | 1.76 | 2.05 | 2.37 | 2.71 | 3.07 | | |
| toluene 10% | 0.10 | 8.90 | 0.31 | 0.01 | 6.58 | | | | | 1.15 | 1.39 | | | | | | |

| Material | δ | Interaction Parameters | | Temp (° C.) | 50 |
|---|---|---|---|---|---|
| Styrene | 9.1 | $\chi AS$ | 6.18 | | |
| Styrene | 9.1 | $\chi AS$ | 6.18 | | |

TABLE 17.1-continued

Evaluation of coating compositions including various organic media
Solubility Interaction Parameters (χ)

| AN | 15.4 | χSo | 0.40 |
| OMS | 7.5 | χAo | 9.72 |
| | | | Fail |

A—AN
S—Styrene
C—AN/Styrene copolymer
o—OMS
x—solvent or solvent mix

What is claimed is:

1. A composition comprising an organic medium and a core-shell polymeric particle, said core comprising, when dry, at least one void and said shell having a calculated shell-organic medium interaction parameter, $X_{PS} > 1.15$.

2. The composition of claim 1 wherein said particle has been formed by a multistage aqueous emulsion polymerization.

3. The composition of claim 1 wherein said shell comprises, as polymerized units, from 18% to 50%, by weight based on the weight of said shell, monomer selected from the group consisting of acrylonitrile, methacrylonitrile, acrylamide, methacrylamide, and mixtures thereof.

4. The composition of claim 1 wherein said shell further comprises, as polymerized units, from 0.1% to 35%, by weight based on the weight of said shell, multiethylenically unsaturated monomer.

5. A method for providing opacity to a dry composition comprising:

(a) forming a composition comprising an organic medium and a core-shell polymeric particle, said core comprising, when dry, at least one void and said shell having a calculated shell-organic medium interaction parameter, $X_{PS} > 1.15$;

(b) applying said composition to a substrate; and (c) drying, or allowing to dry, said applied composition.

6. The method of claim 5 wherein said particle has been formed by a multistage aqueous emulsion polymerization.

7. The method of claim 5 wherein and said shell comprises, as polymerized units, from 18% to 50%, by weight based on the weight of said shell, monomer selected from the group consisting of acrylonitrile, methacrylonitrile, acrylamide, methacrylamide, and mixtures thereof.

8. The method of claim 5 wherein said shell further comprises, as polymerized units, from 0.1% to 35%, by weight based on the weight of said shell, multiethylenically unsaturated monomer.

* * * * *